C. H. APPEL.
Bretzel-Machine.
No. 219,196.  Patented Sept. 2, 1879.
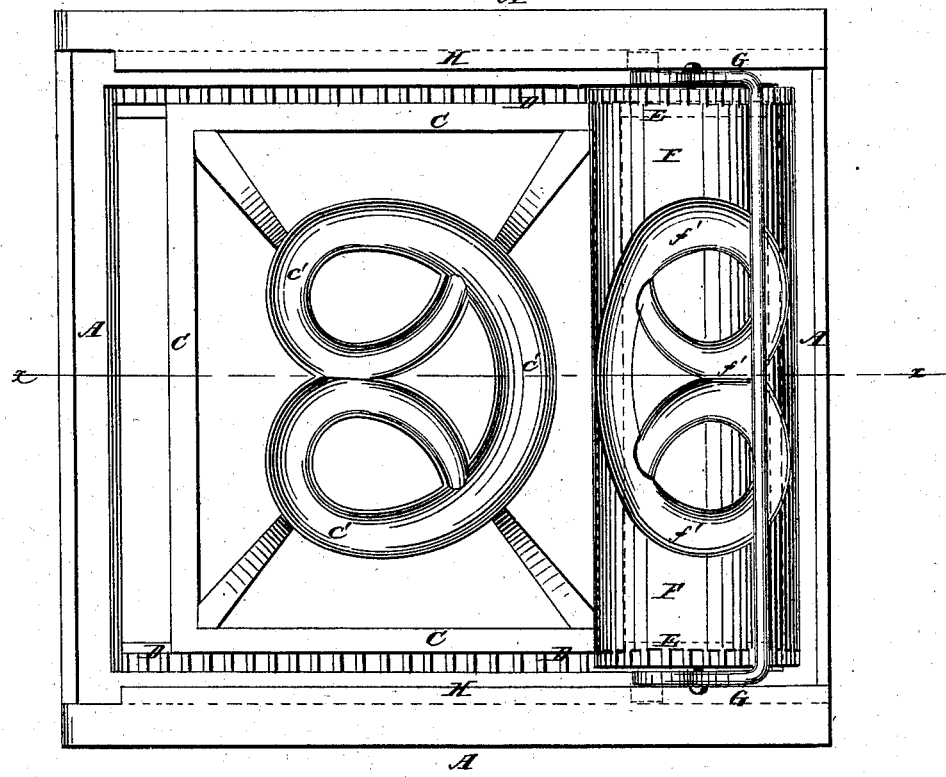
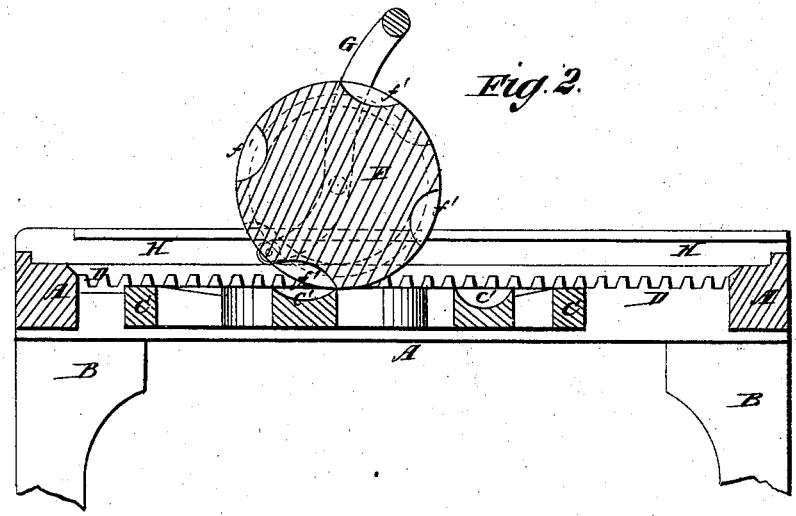
WITNESSES:
Francis McArdle.
C. Sedgwick
INVENTOR:
C. H. Appel
BY Munn & Co
ATTORNEYS.

UNITED STATES PATENT OFFICE.

CHARLES H. APPEL, OF SHIMERVILLE, PENNSYLVANIA, ASSIGNOR TO ELLEN S. APPEL, OF SAME PLACE.

IMPROVEMENT IN BRETZEL-MACHINES.

Specification forming part of Letters Patent No. 219,196, dated September 2, 1879; application filed February 18, 1879.

*To all whom it may concern:*

Be it known that I, CHARLES H. APPEL, of Shimerville, in the county of Lehigh and State of Pennsylvania, have invented a new and useful Improvement in Bretzel-Machines, of which the following is a specification.

Figure 1 is a top view of my improved machine. Fig. 2 is a vertical section of the same, taken through the line $x\ x$, Fig. 1.

Similar letters of reference indicate corresponding parts.

The object of this invention is to furnish a machine for making bretzels which shall be simple in construction and convenient in use, forming the bretzels quickly and uniformly.

The invention consists in the combination of the frame provided with the toothed racks and the grooves, the frame provided with one or more half-molds, the roller provided with the gear-wheels and one or more half-molds, and the levers with each other, as hereinafter fully described.

A is a rectangular frame, which is supported upon legs B, of such a length as to raise the machine to a convenient height. C is a frame, which rests upon cleats attached to the inner sides of the side bars of the frame A. In the middle part of the frame C is formed a mold, $c'$, of the shape and size of a half-bretzel. To cleats attached to the inner sides of the side bars of the frame A are attached rack-bars D, into the teeth of which mesh the teeth of the gear-wheels E, formed upon or attached to the ends of the roller F, so that the said roller F may be drawn back and forth upon the machine squarely and without slipping. In the face of the roller F are formed one or more molds, $f'$, of half-bretzels, corresponding in shape and size with the half-mold $c'$ of the frame C, so that the bretzel may formed by drawing the roller F over a cake of dough laid upon the mold $c'$ of the frame C. The edges of the half-molds $c'\ f'$ are made sharp, so as to cut off the scrap-dough from the bretzel, and allow the said scrap to drop into a receiver placed beneath the machine.

The journals of the roller F work in bearings in the levers G, which have friction-rollers pivoted to their ends to enter grooves H, formed in the side bars of the frame A, or by attaching rabbeted cleats to the said side bars. The upper ends of the levers G are connected by a rod, which serves as a handle for moving the roller F back and forth, and, at the same time, allows the said roller F to be held down with the necessary pressure to form the bretzel and cut off the scrap-dough.

The frame A may be made of any desired size, and any desired number of half-molds $c'$ may be placed upon it.

Having thus described my invention, I claim as new and desire to secure by Letters Patent—

The combination of the frame A, provided with the toothed racks D and the grooves H, the frame C, provided with one or more half-molds, $c'$, the roller F, provided with the gear-wheels E and one or more half-molds, $f'$, and the levers G with each other, substantially as herein shown and described.

CHARLES H. APPEL.

Witnesses:
SAMUEL STAUFFER,
HENRY S. STAUFFER.